(12) United States Patent
Lu et al.

(10) Patent No.: US 10,652,572 B2
(45) Date of Patent: May 12, 2020

(54) MOTION-ADAPTIVE INTRA-REFRESH FOR HIGH-EFFICIENCY, LOW-DELAY VIDEO CODING

(71) Applicant: ATI Technologies, ULC, Markham (CA)

(72) Inventors: Yuefeng Lu, North York (CA); Ihab Amer, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 518 days.

(21) Appl. No.: 15/188,067

(22) Filed: Jun. 21, 2016

(65) Prior Publication Data

US 2017/0318308 A1 Nov. 2, 2017

Related U.S. Application Data

(60) Provisional application No. 62/329,602, filed on Apr. 29, 2016.

(51) Int. Cl.
*H04N 19/527* (2014.01)
*H04L 12/26* (2006.01)
(Continued)

(52) U.S. Cl.
CPC ......... *H04N 19/527* (2014.11); *G02B 27/017* (2013.01); *H04L 1/0018* (2013.01); *H04L 43/087* (2013.01); *H04L 43/0852* (2013.01); *H04L 43/16* (2013.01); *H04N 19/10* (2014.11); *H04N 19/107* (2014.11);
(Continued)

(58) Field of Classification Search
CPC .... H04N 19/14; H04N 19/176; H04N 19/124; H04N 19/82; H04N 19/117
See application file for complete search history.

(56) References Cited

U.S. PATENT DOCUMENTS

2006/0291558 A1* 12/2006 Schreier ............... H04N 19/139
375/240.13
2014/0072034 A1 3/2014 Tanner et al.
(Continued)

FOREIGN PATENT DOCUMENTS

EP 0935396 A2 8/1999

OTHER PUBLICATIONS

International Search Report and Written Opinion dated Aug. 16, 2017 for PCT/CA17/050520, 7 pages.
(Continued)

*Primary Examiner* — Dave Czekaj
*Assistant Examiner* — Berteau Joisil

(57) ABSTRACT

A method includes intra-refresh encoding each picture of a first set of pictures such that a position of a refresh region for the picture is spatially shifted relative to the position of the refresh region for a previous picture of the first set responsive to determining global motion associated with the first does not exceed a specified threshold. The method further includes intra-refresh encoding each picture of a second set of pictures such that a position of a refresh region for each picture of the second set is fixed to be immediately adjacent to a picture edge that is in a direction of global motion associated with the second set responsive to determining the global motion associated with the second set exceeds the specified threshold.

21 Claims, 4 Drawing Sheets

(51) Int. Cl.

| | | |
|---|---|---|
| *H04N 19/507* | (2014.01) | |
| *H04N 19/137* | (2014.01) | |
| *H04N 19/172* | (2014.01) | |
| *H04N 19/10* | (2014.01) | |
| *H04N 19/107* | (2014.01) | |
| *H04N 19/14* | (2014.01) | |
| *H04N 19/176* | (2014.01) | |
| *G02B 27/01* | (2006.01) | |
| *H04L 1/00* | (2006.01) | |
| *G02B 27/00* | (2006.01) | |

(52) U.S. Cl.
CPC ........... *H04N 19/137* (2014.11); *H04N 19/14* (2014.11); *H04N 19/172* (2014.11); *H04N 19/176* (2014.11); *H04N 19/507* (2014.11); *G02B 27/0093* (2013.01); *G02B 2027/014* (2013.01)

(56) References Cited

U.S. PATENT DOCUMENTS

| | | | | |
|---|---|---|---|---|
| 2014/0294072 | A1* | 10/2014 | Elkhazin | .............. H04N 19/107 375/240.12 |
| 2014/0361977 | A1* | 12/2014 | Stafford | ............. G02B 27/0093 345/156 |
| 2015/0146780 | A1 | 5/2015 | Miyoshi et al. | |
| 2016/0011424 | A1 | 1/2016 | Thurber et al. | |

OTHER PUBLICATIONS

Chen, Haoming, et al., "Adaptive Intra-Refresh for Low-Delay Error-Resilient Video Coding", Signal and Information Processing Association Annual Summit and Conference (APSIPA) Dec. 2014, 4 pages.

Schreier, Ralf M., et al., "Motion Adaptive Intra Refresh for Low-Delay Video Coding," IEEE, Digest of Technical Papers International Conference on Consumer Electronics, Jan. 7-11, 2006, pp. 453-454.

International Preliminary Report on Patentability dated Nov. 8, 2018 for corresponding International Application No. PCT/CA2017/050520, 4 pages.

Extended European Search Report dated Nov. 12, 2019 for European Application No. 17788468.1, 12 pages.

Ali, Ismail, et al., "Content Dependent Intra-Refresh Placement for Video Streaming", 2011 3rd Computer Science and Electronic Engineering Conference (CEEC), Jul. 13, 2011, 5 pages.

\* cited by examiner

MOTION-ADAPTIVE INTRA-REFRESH FOR HIGH-EFFICIENCY, LOW-DELAY VIDEO CODING

CROSS-REFERENCE TO RELATED APPLICATION

The present application claims priority to U.S. Patent Application Ser. No. 62/329,602, entitled "Motion-Adaptive Intra-Refresh for High-Efficiency, Low-Delay Video Coding" and filed on Apr. 29, 2016, the entirety of which is incorporated by reference herein.

BACKGROUND

Block-based video coding uses spatial and temporal redundancy between blocks of video in successive pictures to provide efficient encoding of video. Typically, a stream of pictures is encoded as sets of entirely intra-coded pictures (I-pictures) and inter-coded, or predictive, pictures, such as forward-predictive pictures (P-pictures) and bi-directional predictive pictures (B-pictures). Because the I-pictures are entirely intra-coded, whereas the P-pictures and B-pictures are at least partially predictively inter-coded, the coding of I-pictures takes significantly more bits than P-pictures and B-pictures, and thus may negatively impact the bit rate, jitter, and latency of a transmitted bit stream containing these encoded pictures. One approach to improving latency and jitter is the implementation of an intra-refresh mode whereby a region of each picture of a set of pictures is intra-coded, or "refreshed," while the remaining regions of the picture are predictively inter-encoded. In the intra-refresh mode, motion predictions between pictures are restricted to the regions of previous pictures of the set that have already been refreshed (such regions typically being referred to as "clean" regions), and are prevented from using the regions of previous pictures that have not yet been refreshed (these regions typically being referred to as "dirty" regions). In conventional intra-refresh modes, the region that is entirely intra-coded (i.e., the "refresh" region) is a fixed size and shifts positions between successive pictures of an intra-refresh set of pictures. Although the goal of intra-refresh techniques is to smooth out the bitrate of the resulting encoded bit stream, the shifting position of the refresh region in conventional intra-refresh techniques often may cause significant bit rate variation, or jitter, in the presence of global motion in the displayed content as often occurs in virtual reality (VR) applications or other application with substantial motion of the "camera" representing the perspective view of the rendered pictures.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
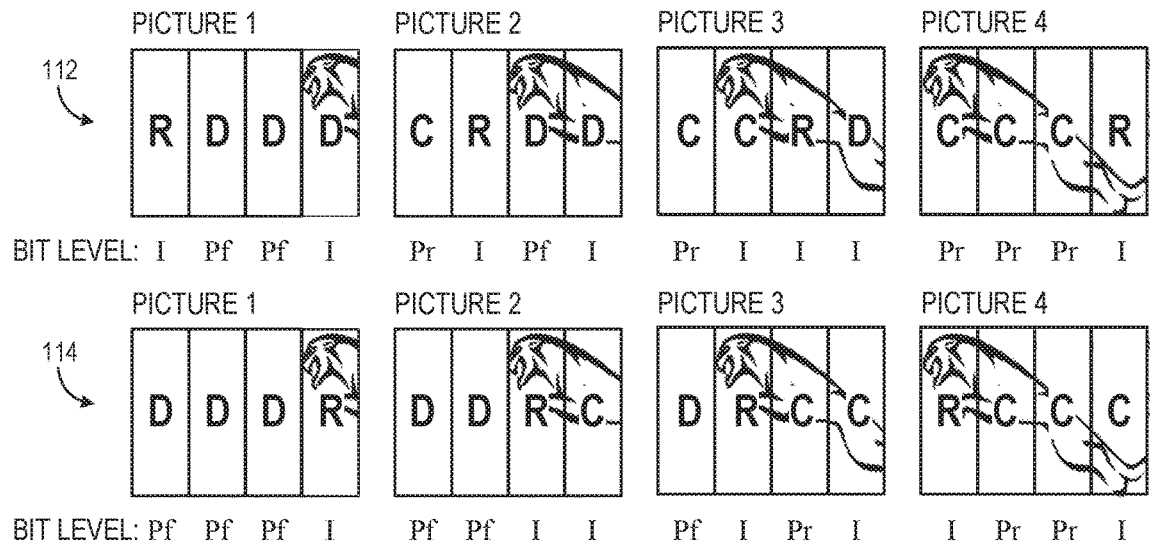
FIG. 1 is a diagram illustrating a motion-adaptive intra-refresh encoding technique and a comparison of this technique to conventional intra-refresh encoding techniques in accordance with some embodiments.
Figure 1:
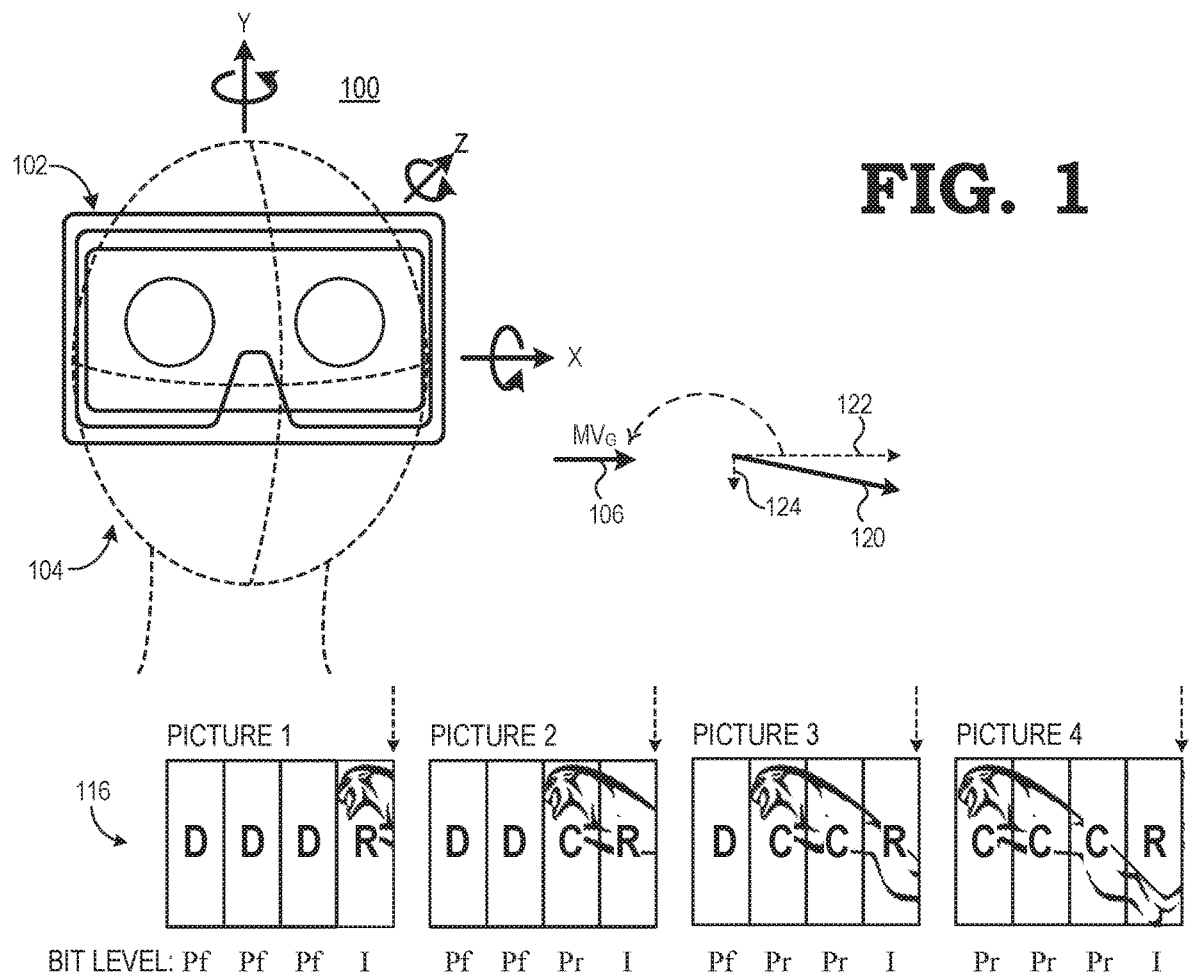

Virtual reality (VR) and augmented reality (AR) systems typically rely on a sense of "presence" when displaying VR or AR content to a user through a head mounted display (HMD) device. One significant factor in providing this sense of presence is the latency or jitter involved in encoding, transmitting, decoding, and displaying pictures containing the VR or AR content. Thus, a reduction in the latency or jitter in the transmission of the bit stream representing the encoded video stream can provide a corresponding reduction in the overall latency and jitter in the video processing pipeline, and thus provide improved "presence" in VR and AR applications. To this end, the following describes a video processing system that employs a "motion-adaptive intra-refresh mode" that accounts for global motion present in the display content due to, for example, motion in an HMD device used to display the content or other motion of the virtual camera representing the perspective view from which the pictures are rendered. In at least one embodiment, the video processing system determines an estimate of the global motion for a picture or a set of pictures. This global motion estimate is determined, for example, from motion sensor data from the HMD device itself, or from an analysis of the motion of content within the picture, or the motion of content between successive pictures.

In the event that the global motion estimate does not represent sufficient global motion, the video processing system utilizes a conventional intra-refresh mode in which the position of the refresh region shifts between successive pictures of an intra-refresh set of pictures. However, in the event that the global motion estimate signals sufficient global motion, the video processing system implements an intra-refresh mode that accounts for this global motion so as to provide for a resulting portion of the bit stream that has a smoothed bit rate and thus provides reduced transmission latency. In this motion-adaptive intra-refresh mode, the video processing system identifies the edge of the picture that is in the direction of the global motion estimate (or the primary motion component thereof in embodiments whereby the motion-adaptive intra-refresh mode is restrained to only cardinal directions (that is 0, 90, 180, and 270 degrees), and when intra-refresh encoding the picture fixes or forces the refresh region (that is, the intra-coded region) of the picture to be a region of the display that is immediately adjacent to the identified edge of the picture. As described in greater detail, by fixing the refresh region of pictures being encoded to the edge regions of the pictures where new content is most likely to be introduced, the motion vector search process for subsequent pictures in the intra-refresh set typically is more efficient, and thus results in an improved average bit rate and improved smoothing of the bit rate.

In the following, implementations of intra-refresh modes wherein the pictures are divided into horizontally-arranged regions are illustrated for ease of illustration. Moreover, the global motion when a user uses an HMD device or other VR-related display typically is more prevalent in the horizontal plane than the vertical plane, so the horizontally-arranged regions in the examples below are well-matched to the perspective motion. However, it should be appreciated that the same techniques described herein also can be applied in implementations using vertically-arranged regions in the pictures, and further that the logical partitioning of pictures into regions can switch between horizontally-arranged regions for some pictures and vertically-arranged regions for other pictures, as circumstances warrant.

FIG. 1 illustrates this dual-mode approach to intra-refresh encoding in a video processing system 100 in accordance with some embodiments. In the depicted example, the video processing system 100 is implemented in part by a head mounted display (HMD) device 102 mounted on the head 104 of a user. The video processing system 100 includes a video encoding sub-system (not shown in FIG. 1) that renders and encodes pictures a VR or AR video stream, with the resulting encoded bit stream being transmitted to the HMD device 102. The HMD device 102 decodes the encoded bit stream to recover representations of the pictures for display at the HMD device 102.

As the HMD device 102 is mounted on the head 104 of the user, the HMD device 102 may be subject to frequent and substantial movement, including rotation about one or more of the X, Y, or Z axis (i.e., roll, yaw, and pitch), as well as translation in one or more of the X, Y, or Z directions. Typically, the video processing system 100 incorporates this movement into the video content presented to the user by rendering the pictures to contain image content from the perspective of a virtual camera representing the current pose of the HMD device 102, and updating the perspective of this virtual camera as the pose of the HMD device 102 changes as the user moves about. The movement of the HMD device 102, and the corresponding incorporation of this movement into the rendered display content, results what is typically referred to as "global motion," which is the large-area motion or movement present in the content caused by camera motion (in this case, motion of the "virtual" camera representing the pose of the user's head 104, and thus the perspective of the user). A result of this global motion often is that, over a succession of pictures, "new" content (that is, content not present in previous pictures) is likely to appear at one edge or side of the display panel while "old" content is likely to move off the display panel at the other edge or side. To illustrate, if the user's head 104 is to rotate from left to right, the sequence of pictures presented during this motion would show new content entering from the right (as the user's perspective shifts right) and already displayed content sliding out of view on the left. Conversely, if the user's head were to rotate from right to left, the sequence of pictures presented during this motion would show new content entering from the left (as the user's perspective shifts left) and already displayed content sliding out of view on the right. Rotation of the user's head 104 up and down would likewise show a shift or sliding of new content in on either the top or bottom edge (depending on whether the user is looking up or looking down) and old content out on the opposite edge.

In conventional intra-refresh encoding schemes, the rendering of pictures that incorporate global motion typically results in less efficient encoding and thus higher latency in the transmission of the resulting encoded bit stream. To illustrate, FIG. 1 depicts two conventional intra-refresh encoding scenarios for a sequence of four pictures: a worst case scenario 112 and a best case scenario 114. For both scenarios, assume that the global motion estimate for this set of four pictures is represented as a global motion vector 106 (also denoted as "$MV_G$") in the horizontal direction from left to right (that is, has a rightward direction relative to the user's perspective). Note that while the term "motion vector" in a video codec context typically refers to the vector pointing from a block in a current picture to the matching block in a reference picture, the term "global motion vector", as used herein, refers to the direction of motion of the virtual camera represented in the global motion. For FIG. 1, the worst case scenario 112 represents a scenario whereby the shift pattern of the refresh region between pictures is the same as of the direction of the global motion vector $MV_G$, whereas the best case scenario 112 represents a scenario whereby the shift direction of the refresh region is opposite of the direction of the global motion vector $MV_G$.

As explained above, in a conventional intra-refresh encoding process, the position of the refresh region for each successive picture of an intra-refresh set is spatially shifted in a particular shift direction or pattern relative to the position of the refresh region in the preceding picture of the intra-refresh set. That is, in conventional intra-refresh modes, the position of the refresh region in a picture is based solely on the position of that picture within an intra-refresh set or cycle. To illustrate, for an intra-refresh set of four pictures, the refresh region of the first picture can be adjacent to one edge and occupy the first quarter of the first picture in the shift direction, the refresh region for the second picture of the set can occupy the second quarter of the second picture in the shift direction, the refresh region for the third picture of the set can occupy the third quarter of the third picture in the shift direction, and the refresh region for the fourth picture of the set can occupy the last quarter of the fourth picture in the shift direction. The other regions of each picture are then classified as either "clean" or "dirty. The classification of each region of an encoded picture as a refresh (R) region, a clean (C) region, or a dirty (D) region represents the manner in which the region can be encoded and decoded. A refresh region, being intra-encoded, does not need to reference any other picture or region to be decoded. However, encoding a refresh region requires the most bits, and thus transmission of a refresh region requires the greatest bit rate of the three regions. The motion vector search range when encoding a clean region of a picture is restricted to only the refresh region and the clean region(s)(if any) of the previous picture so as to avoid inter-picture error propagation into the region that has been intra-refreshed. In contrast, the motion vector search range when encoding a dirty region of a picture is unrestricted (free) and thus may encompass all regions of a previous picture. Thus, because the matching block in the previous picture may be in a dirty region of the previous picture, and thus fall outside of the motion vector search range for the block under evaluation in a clean region of the present picture, the block under evaluation must then be intra-encoded, or inter-coded but with the similar bits as intra-coded case since the block matching fails or is suboptimal. However, if this same block were located in a dirty region of the present picture, referencing the matching block would have no limitation or restriction in the previous picture, and thus inter-encoded as a motion vector and residual. As such, the bit rate for encoding a dirty region of a picture typically is at or lower than the bit rate for encoding a clean region. That is, using "I" to denote the bit level (that is, number of bits) needed to encode a refresh region, "Pr" to denote the bit level needed to encode a clean, or "restricted," region, and "Pf" to denote the bit level needed to encode a dirty, or "free", region, the relationship between these bit levels generally is summarized as: $I >> Pr >= Pf$.

In worst case scenario 112 (which represents a typical whole cycle of intra-refresh other than the initial cycle), an intra-refresh set comprises four pictures, denoted Pictures 1-4. As there are four pictures in this set, each picture is logically segmented into four regions, which in the example of FIG. 1 are depicted as horizontally-arranged regions. As noted, for worst case scenario 112, the intra-refresh encoding mode is set so that the shift pattern of the refresh region (denoted using the letter "R") is from left-to-right between pictures. Thus, when encoding Picture 1, the left-most region is entirely intra-encoded as a refresh region. As the remaining three regions of Picture 1 represent regions that are neither currently being refreshed or corresponding spatially to regions in previous pictures of the intra-refresh set that were previously refreshed, the remaining regions of Picture 1 are considered dirty regions (denoted using the letter "D") and thus inter-encoded as such. When encoding Picture 2, the position for intra-refresh is shifted right to the middle-left region, which is thus entirely intra-encoded as a refresh region. As the left-most region of Picture 2 corresponds to the refresh region of Picture 1 (that is, the left-most region of Picture 2 corresponds to a region in a previous picture that was refreshed), the left-most region of Picture 2 is identified as a clean region (denoted using the letter "C") and inter-encoded as such, whereas the middle-right region and the right-most region of Picture 2 are identified and inter-encoded as dirty regions as they are not limited to block searching to any regions in Picture 1 that were refreshed. When encoding Picture 3, the refresh region is again shifted right relative to Pictures 1 and 2, and thus the middle-right region of Picture 3 is entirely intra-encoded as a refresh region for Picture 3, whereas the left-most region and middle-left region are inter-encoded as clean regions, and the right-most region inter-coded as a dirty region. The refresh region is again shifted right relative to Pictures 1, 2, and 3, and thus the right-most region of Picture 4 is entirely intra-encoded as a refresh region. The left-most, middle-left, and middle-right regions of Picture 4 correspond to regions that were refreshed in Pictures 1-3, and thus are inter-encoded and marked as clean regions.

As also depicted in Pictures 1-4 of worst case scenario 112, the global motion of the HMD device 102 for the time picture corresponding to Pictures 1-4 results in new content (represented in FIG. 1 by the icon of a leaping jaguar) being shifted in from the right edge of the picture while old content shifts out from the left edge of the picture. The right-to-left direction of this new content (resulting from the left-to-right global motion) is opposite the shift direction of the refresh region in Pictures 1-4, and thus results in inefficient encoding. To illustrate, for Picture 1, the refresh region R is intra-coded. However, as the right-most region of Picture 1 has all-new content, its coding efficiency is basically equal to the fully intra-coded case as well, resulting in two intra-coded regions having bit levels I and two dirty regions having bit levels Pf. In Picture 2, the middle-left region is intra-coded as the refresh region. However, as all new content has again been introduced at the right-most region, the right-most region of Picture 2 is intra-coded as well, resulting in two regions intra-coded at bit level I, a clean region intra-coded at bit level Pr, and a dirty region intra-coded at bit level Pf. The situation gets worse for encoding Picture 3. For this picture, the middle-right region is encoded as the refresh region and thus requires a bit level I. As with Pictures 1 and 2, new content has shifted in on the right side due to the global motion ($MV_G$), and thus the right-most region of Picture 3 also has to be intra-code at bit level I. Further, because the middle-left region of Picture 3 is substantially composed of content that was is not found in the refresh region Picture and the clean regions of Picture2, the middle-left region of Picture 3 must be primarily intra-coded at bit level I as well. As the left-most region of Picture 3 does not contain new content from dirty regions in previous pictures, this region is inter-encoded at bit level Pr. For Picture 4, the necessary number of bits for the encoding eases up, as the refresh region for Picture 4 matches the region in which all-new content is being introduced due to the global motion, and the other regions contain content already present in clean regions of previous pictures, and thus allowing all but the refresh region of Picture 4 to be inter-encoded at bit level Pr. As such, encoding Pictures 1-4 in the worst-case scenario 112 results in two pictures each having two regions encoded a bit level I regions and one picture having three regions encoded at bit level I, and thus resulting in an encoded bit stream portion with a significantly varying bit rate.

The intra-refresh set for best case scenario 114 also comprises four pictures, denoted Picture 1, Picture 2, Picture 3, and Picture 4 logically segmented into the same four horizontally-arranged regions. Further, for best case scenario 114, the conventional intra-refresh encoding mode is set so that the refresh region shifts right-to-left between pictures. Thus, when encoding Picture 1, the right-most region is intra-encoded as a refresh region, when encoding Picture 2, the middle-right region is intra-encoded as a refresh region, when encoding Picture 3, the middle-left region is intra-encoded as a refresh region, and when encoding Picture 4, the left-most region is intra-encoded as a refresh region. However, unlike the worst-case scenario 112, in the best-case scenario 114 the direction of the refresh regions shift follows the direction by which new content is introduced for display. The resulting bit levels for encoding the respective regions of Pictures 1-4 are depicted in FIG. 1. Thus, as shown, best case scenario 112 requires three pictures each having two regions encoded at bit level I and one picture having one region encoded at bit level I. Thus, while best case scenario 114 exhibits a somewhat smoother bit rate for transmission of the encoded representations of the four pictures compared to the worst case scenario 114, the bit rate of the best case scenario 114 remains considerably jittery and thus could negatively impact the latency or jitter of the resulting encoded display stream.

Turning now to the motion-adaptive intra-refresh encoding technique described herein, example scenario 116 depicts an application of this process to the same four picture set depicted in scenarios 112, 114. However, unlike the conventional intra-refresh encoding process represented by scenarios 112, 114 in which the position of the refresh region is shifted in a particular direction between each picture of the intra-refresh set, the motion-adaptive intra-refresh encoding process selects the refresh region for a picture to be the region immediately adjacent to the picture edge that is in the direction of the global motion associated with that picture. As noted above, in the example of FIG. 1 the global motion is from left-to-right, and thus the right edge would be identified as the edge of the display in the direction of the global motion. Further, for purposes of this example, it is assumed that the magnitude and direction of the global motion vector $MV_G$ is constant across all four pictures; that is, each of Pictures 1-4 has the same global motion estimate. Such assumption is based on the fact that the global motion hardly appears isolated in the video sequence, while lasts during a group of pictures.

As the right edge is identified as the edge in the direction of the global motion, the right-most region (that is, the region immediately adjacent to the right edge) of each of Pictures 1-4 is selected as the region to be refreshed for each picture. Thus, as new content is introduced in the right-most region of each of Pictures 1-4 due to the global motion, and as the right-most region is selected as the refresh region for each of Pictures 1-4 in view of the global motion, the intra-coding of the right-most region of each of Pictures 1-4 as refresh regions at bit level I serves double duty—the same intra-coding of the one region acts to satisfy both the refresh intra-coding requirements and the need to intra-code newly introduced content. Moreover, because the refresh region is in a fixed position between pictures and because this fixed position is where the new content occurs, clean regions shift across the pictures in the same direction as new content, and thus allowing the clean regions of each picture to be inter-encoded, compared to the need to intra-code some of the clean regions in the scenarios 112, 114 representing conventional intra-refreshing techniques. The resulting bit rate encoding profile is shown below Pictures 1-4 in scenario 116. As demonstrated, none of Pictures 1-4 require more than one region to be intra-coded using the motion-adaptive infra-refresh technique, and thus providing for a smoother bit rate for the resulting encoded bit stream compared to conventional methods.

Although the example of scenario 116 assumes the regions of a given picture are of equal width, and that the size of particular region type is constant across pictures, it typically is advantageous to dynamically adjust the size of the refresh region based on one or more factors, which in turn results in varying sizes for the clean and dirty regions for successive pictures in the same intra-refresh set. In particular, selecting the width of the refresh region for a picture to match the "width" of new content introduced from the corresponding edge of that picture due to the global motion can provide an optimal setting for the refresh region. To illustrate, if the width of the introduced new content is greater than the width of the refresh region, a portion of that new content would not be covered by the intra-encoding of the refresh region and so at least a portion of the adjacent region would need to be intra-coded to cover at portion of the new content, and thus there is no advantage to a narrow refresh region. Conversely, if the refresh region is wider than the width of the new content being introduced in that picture due to the global motion, the amount of picture content fully intra-coded by be unnecessarily large. Further, the C region may expand out so that the C region in one picture covers a portion of what is a D region in the previous picture. This in turn would impact the coding efficiency of the C region as the D region in the previous picture cannot be used for motion vector searching. As such, the width of the refresh region can result in optimum or improved encoding efficiency when matched to the global motion estimate, which represents the rate at which new content is introduced from the edge of the picture at which the refresh region is fixed.

Figure 2:
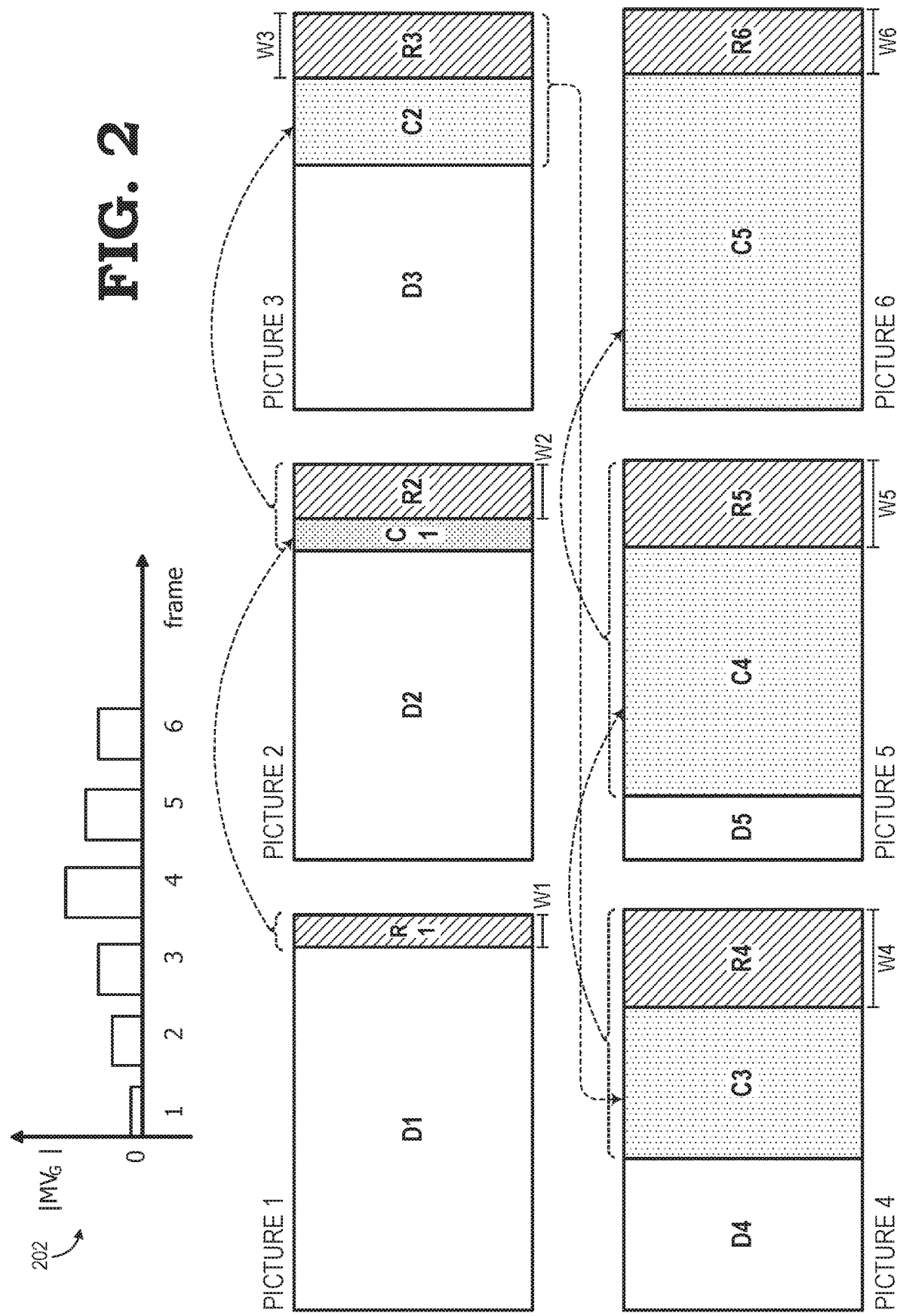
FIG. 2 is a diagram illustrating a technique for dynamically setting a width of a refresh region of a picture to be encoded based on a global motion estimate associated with the picture in accordance with some embodiments.

FIG. 2 illustrates an example of this dynamic configuration for the refresh region during motion-adaptive intra-refresh encoding of a stream of pictures. In the depicted example, a video stream includes an intra-refresh set having six pictures, denoted Pictures 1-6. Chart 202 illustrates the magnitude of the global motion vector $MG_G$ corresponding to each of the pictures. The particular global motion vector $MG_G$ for each of the pictures is determined, for example, from the movement of the HMD device 102 at a time corresponding to the picture. Further, for this example, the global motion vector $MV_G$ for each of Pictures 1-6 is determined to be a left-to-right motion. Accordingly, using the motion-adaptive intra-refresh technique described herein, the refresh region for each of Pictures 1-6 is fixed to the region immediately adjacent to the right edge.

When encoding Picture 1, the refresh region R1 at the right edge of this picture is set to a width of W1 based on the global motion magnitude determined for that picture. Further, because Picture 1 is the first picture in this intra-refresh set, the remaining region of Picture 1 is a dirty region D1. When encoding Picture 2, the refresh region R2 at the right edge of this picture is set to a width W2 based on global motion magnitude determined for that picture. Further, the refresh region R1 of Picture 1 becomes the clean region C1 of Picture 2, with the leftward shift in position due to the global motion. The remainder of Picture 2 thus is a dirty region D2. For picture 3, the refresh region R3 is set to width W3 based on the corresponding global motion magnitude. The refresh region R2 and clean region C1 of Picture 2 then becomes the clean region C2 with a leftward shift in position due to the global motion, and the remainder of Picture 3 is a dirty region D3. The same process results in the illustrated refresh region R4 having width W4, a clean region C3 resulting from clean region C2 and refresh region R3, and dirty region D4 for Picture 4, the illustrated refresh region R5 having width W5, clean region C4 resulting from clean region C3 and refresh region R4, and dirty region D5 for Picture 5, and the illustrated refresh region R6 having width W6 and clean region C5 resulting from clean region C4 and refresh region R5 for Picture 6.

Figure 3:
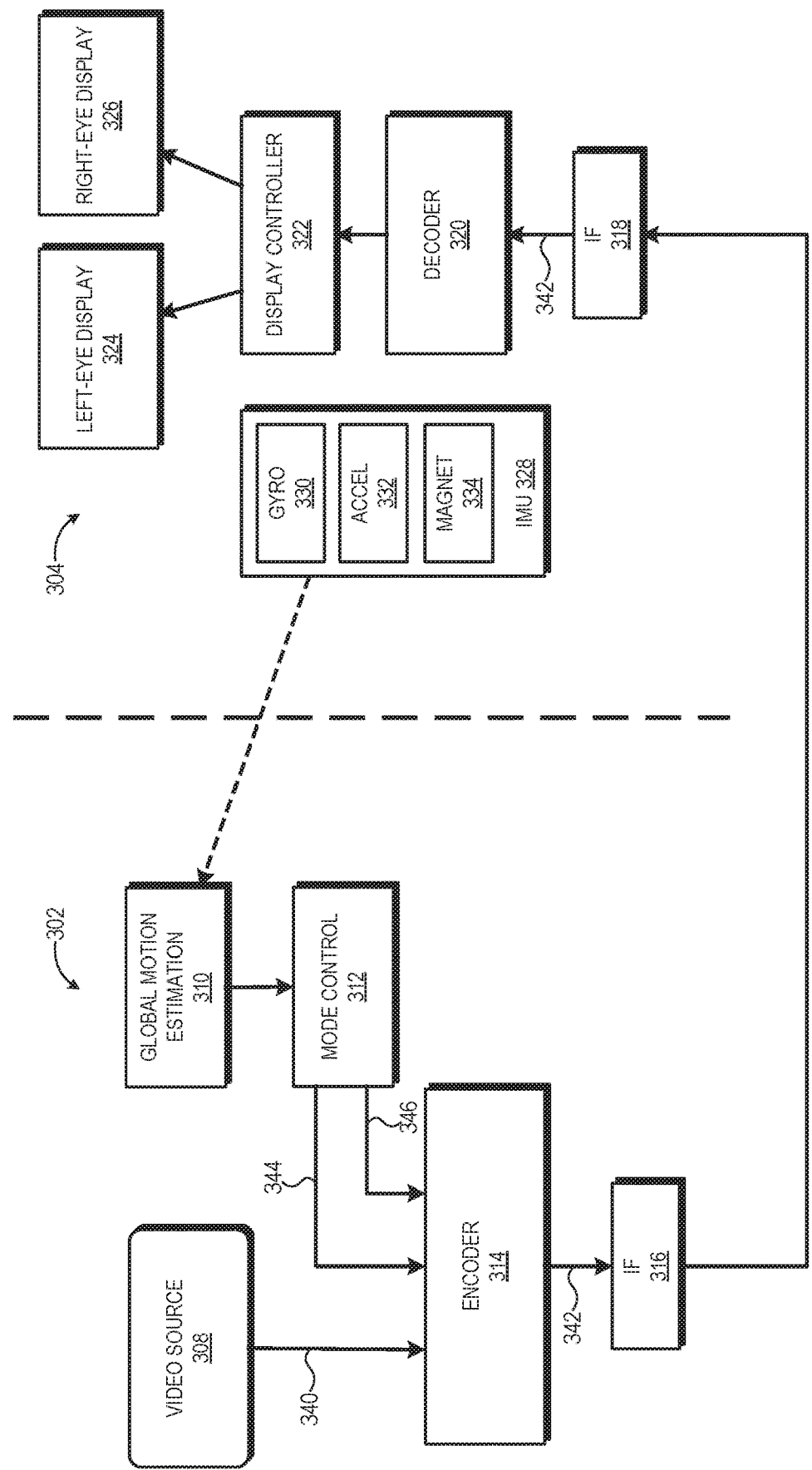
FIG. 3 is a block diagram illustrating a video processing system utilizing motion-adaptive intra-refresh encoding in accordance with some embodiments.

FIG. 3 illustrates an example implementation of the video processing system 100 in accordance with at least one embodiment of the present disclosure. In the depicted example, the video processing system 100 includes a video generation sub-system 302 and a HMD device 304 (one embodiment of HMD device 102) connected via a transmission link 306, which comprises, for example, a wired communication link, a wireless link, or a combination thereof. Examples of wired communication links include an Ethernet link, a Universal Serial Bus (USB) link, a High Definition Multimedia Interface (HDMI) link, and the like. Examples of wireless communication links include an IEEE 802.11 local area network, a Bluetooth™ personal area network, and the like. The video generation sub-system 302 includes a video source 308, a global motion estimation module 310, a mode control module 312, an encoder 314, and a link interface 316. The HMD device 304 includes a link interface 318, a decoder 320, a display controller 322 and one or more display panels, such as a left-eye display panel 324 and a right-eye display panel 326. Further, in some embodiments, the HMD device 304 includes an inertial measurement unit (IMU) 328 having one or more motion-based sensors, such as a gyroscope 330, an accelerometer 332, and a magnetometer 334. Other examples include a structured light sensor, a laser sensor, and the like.

As a general overview, the video generation sub-system 302 operates to render a stream of pictures representative of VR/AR content, encode this stream 340 of pictures into an encoded bit stream 342, and transmit the encoded bit stream to the HMD device 304, whereupon the decoder 320 of the HMD device 304 operates to decode the encoded bit stream 342 to obtain the stream 340 of pictures (or a lossy representation thereof), which are provided for display to the user via the display controller 322 and display panels 324, 326. To this end, the video source 308 operates to render the stream of pictures. As such, the video source 308 comprises, for example, one or more processors executing a VR/AR application that renders pictures representative of the VR/AR content based at least in part on the motion or pose of the HMD device 304, as measured by the IMU 328 or by using other head-tracking mechanisms. The encoder 314 operates to encode the pictures to generate the encoded bit stream 342, which is provided to the link interface 316 for transmission over the transmission link 306.

During the encoding process, the encoder 314 can include be a dual-mode encoder in that the encoder 314 is configured to operate in either a conventional intra-refresh coding mode in which the refresh region shifts positions between pictures of an intra-refresh set or the motion-adaptive intra-refresh mode described herein. To configure the encoder 314 accordingly, the global motion estimation module 310 repeatedly obtains updated global motion estimates and provides each updated global motion estimate to the mode control module 312. The mode control module 312 then determines from the global motion estimate whether to implement the conventional intra-refresh mode or the motion-adaptive intra-refresh mode, and configures the encoder 314 accordingly via mode configuration signal 344. Further, in the event that the motion-adaptive intra-refresh mode is implemented, the mode control module 312 further determines the characteristics of the refresh region to be implemented by the encoder 314 for the current picture to be encoded, including to which edge of the picture the refresh region is to be adjacent and the width of the refresh region, and the encoder 314 then can signal these parameters to the encoder 314 via refresh region configuration signal 346.

Figure 4:
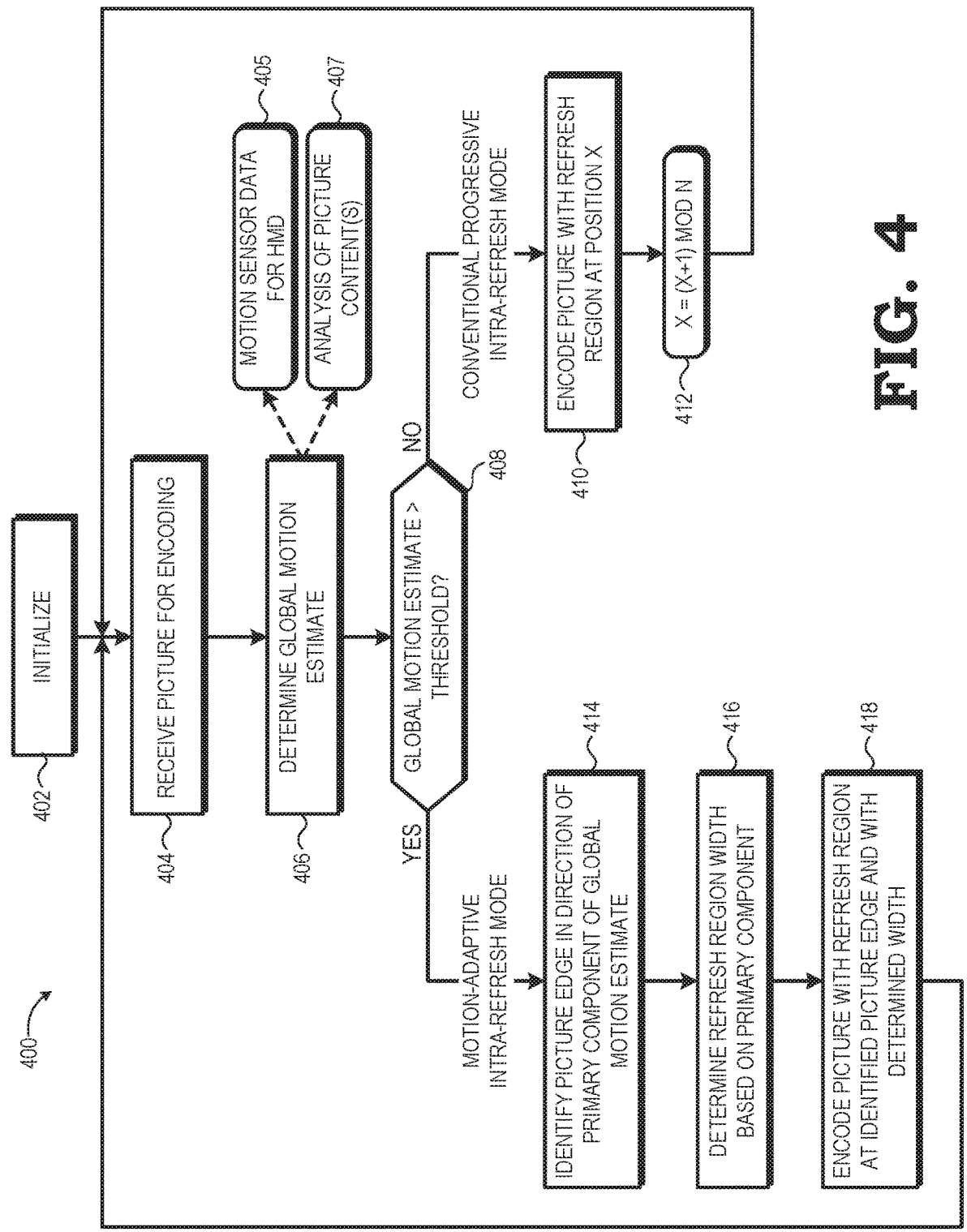
FIG. 4 is a flow diagram illustrating a method for dual-mode intra-refresh encoding of a video stream in accordance with some embodiments.

FIG. 4 illustrates a method 400 of operation of the global motion estimation module 310, the mode control module 312, and the encoder 314 in greater detail. Before commencing with picture encoding, at block 402 the encoder 314, mode control module 312, and global motion estimation module 310 are initialized with the relevant parameters. To illustrate, the encoder 314 is, in some embodiments, configured to implement a specified number N of pictures in an intra-refresh set, the mode control module 312 is configured with a specified threshold to be applied to global motion estimates, and a temporary variable X set to one (1). After initialization, the video source 308 begins rendering pictures for the stream 340, and each rendered picture is received at the encoder 314 at an iteration of block 404.

Concurrent with the rendering and receipt of the picture, at block 404 the global motion estimation module 310 determines a global motion estimate $MV_G(i)$ for the current picture iteration i. As represented by block 405, in one embodiment the global motion estimation module 310 determines the global motion estimate $MV_G(i)$ based on sensor data from one or more motion-based sensors of the IMU 328. To illustrate, the IMU 328 periodically samples one or more of the gyroscope 330, the accelerometer 332, or the magnetometer 334 to determine the current pose of the HMD device 304 and a current change in the pose of the HMD device 304, and from this information the global motion estimation module 310 determines the global motion estimate $MV_G(i)$, which includes, for example, a transform of any rotational movement to a corresponding translational movement relative to the display space of the display panels 324, 326. Alternatively, as represented by block 407, the global motion estimation module 310 determines the global motion estimate $MV_G(i)$ using any of a variety of global motion techniques that employ motion-based analysis of the current picture to be encoded using the current picture and one or more previous pictures.

As described herein, the motion-adaptive intra-refresh mode "fixes" the refresh region of an intra-refresh-coded picture to the region immediately adjacent to the picture edge that is in the direction of the global motion for that picture. However, it will be appreciated that the global motion could have a direction that is not parallel with the four cardinal directions representing the four edges of the picture. To illustrate, referring briefly to FIG. 1, the global motion estimate $MV_G(i)$ is represented by the motion vector 120, which has a direction both to the right and downward (relative to the user's perspective). In such situations, the global motion estimation module 310 uses the primary directional component of the global motion estimate $MV_G(i)$; that is, the directional component of the global motion estimate $MV_G(i)$ that is parallel with one of the four cardinal axes and which has the greatest magnitude. To illustrate, motion vector 120 has both a horizontal directional component 122 and a vertical directional component 124, and as the horizontal direction component 122 is greater in magnitude, the horizontal directional component 122 is used as the global motion estimate $MV_G(i)$. Alternatively, as the user is more likely sensitive to content introduced due to horizontal motion than vertical motion, the horizontal directional component of the global motion estimate is utilized as $MV_G(i)$ by default.

At block 408, the mode control module 312 receives the global motion estimate $MV_G(i)$ and compares the magnitude of this representation of the global motion to a specified threshold that represents the minimum global motion deemed sufficient to switch modes to the motion-adaptive intra-refresh coding mode. The threshold is determined through modeling, experimentation, or the like, and in some instances is modified over time based on feedback or other analysis of the impact of various values for the threshold. In the event that the magnitude of the global motion estimate $MV_G(i)$ does not exceed this threshold, the mode control module 312 configures the encoder 314 via mode configuration signal 344 to employ the conventional intra-refresh mode for encoding the picture received at block 404. In response to being so configured, at block 410 the encoder 314 intra-refresh encodes the picture with the position of the refresh region within the picture specified by the variable X, which represents the position of the picture within the current intra-refresh set. At block 412, variable X is shifted to the next refresh position for the set (that is, X is set to (X+1) MOD N).

Returning to block 408, in the event that the magnitude of the global motion estimate $MV_G(i)$ exceeds the threshold, the mode control module 312 configures the encoder 314 via mode configuration signal 344 to employ the motion-adaptive intra-refresh mode for the picture. To this end, at block 414 the mode control module 312 identifies the picture edge that is in the direction of the global motion estimate $MV_G(i)$ (or in the direction of the primary component of the global motion estimate $MV_G(i)$). To illustrate, a global motion from left-to-right would result in the selection of the right edge of the picture, whereas a global motion from right-to-left would result in the selection of the left edge of the picture. Similarly, vertical-arranged refresh regions can be implemented, upward global motion would result in the selection of the top edge of the picture, whereas downward global motion would result in the selection of the bottom edge of the picture. Moreover, this motion-adaptive intra-refresh technique is not limited to motion in cardinal directions (that is, purely right-left, or up-down). To illustrate, this same approach can be utilized for motion in any direction, such as motion from upper-left-to-bottom right, bottom-right-to-upper-left, upper-right-to-bottom-left, bottom-left-to-upper-right, and the like. At block 416, the mode control module 312 determines the width of the refresh region to be encoded for the picture based on the magnitude of the global motion estimate $MV_G(i)$ (or the primary directional component thereof). In particular, the refresh region width is calculated in terms of number of pixels as a function of the magnitude of the global motion estimate, the picture rate, and the resolution of the picture. With the picture edge and refresh region width determined, the mode control module 312 signals these parameters to the encoder 314 via refresh region configuration signal 346.

At block 418, the encoder 314 intra-refresh encodes the picture using the refresh region configuration parameters to generate a bit stream portion representing the resulting encoded stream and incorporates this bit stream portion into the encoded bit stream 342 transmitted to the HMD device 304. In this encoding process, the encoder 314 uses the identified picture edge and identified refresh region width to intra-code a region immediately adjacent to the identified picture edge and having a width corresponding to the indicated refresh region with. The remainder of the picture is encoded as one or both of a dirty region or a clean region, as described above.

Although method 400 depicts one implementation whereby the intra-refresh mode is switched between each picture, in other embodiments the switch between modes is linked to the completion of an intra-refresh set. That is, the switch between modes can be limited to occur only between the completion of one intra-refresh set/cycle and the start of the next intra-refresh set/cycle, and thus the mode selected for the intra-refresh set is applied to each picture in that set.

In some embodiments, certain aspects of the techniques described above are implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage devices, solid state storage devices such as Flash memory, a cache, random access memory (RAM) or other non-volatile memory device or devices, and the like. The executable instructions stored on the non-transitory computer readable storage medium in source code, assembly language code, object code, or other instruction format that is interpreted or otherwise executable by one or more processors.

Note that not all of the activities or elements described above in the general description are required, that a portion of a specific activity or device may not be required, and that one or more further activities can be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

What is claimed is:

1. In a video processing system, a method comprising:
   determining a first global motion estimate for a first picture to be rendered;
   identifying an edge of the first picture as the edge of the first picture that is in a direction of the first global motion estimate;
   in response to identifying the edge of the first picture, intra-refresh encoding the first picture at an encoder of the video processing system by encoding a region of the first picture immediately adjacent to the identified edge as an intra-coded refresh region of the first picture; and
   wherein a width of the refresh region is set based on a magnitude of a primary directional component of the first global motion estimate.

2. In a video processing system, a method comprising:
   determining a first global motion estimate for a first picture to be rendered;
   comparing the first global motion estimate to a threshold;
   identifying an edge of the first picture as the edge of the first picture that is in a direction of the first global motion estimate;
   in response to identifying the edge of the first picture, intra-refresh encoding the first picture at an encoder of the video processing system by encoding a region of the first picture immediately adjacent to the identified edge as an intra-coded refresh region of the first picture; and
   wherein identifying the edge of the first picture and encoding a region of the first picture immediately adjacent to the identified edge as an intra-coded refresh region are responsive to the first global motion estimate exceeding the threshold.

3. The method of claim 2, further comprising:
   determining a second global motion estimate for a second picture to be rendered;
   comparing the second global motion estimate to the threshold; and
   responsive to the second global motion estimate not exceeding the threshold, intra-refresh encoding the second picture at the encoder by encoding a region of the second picture that is selected based on a refresh region pattern in which a position of an intra-coded refresh region shifts between successive pictures of a set of pictures.

4. The method of claim 1, further comprising:
   transmitting an encoded bit stream to a head mounted display (HMD) device, the encoded bit stream including the encoded first picture; and
   wherein determining the first global motion estimate comprises determining the first global motion estimate based on a motion of the HMD device.

5. The method of claim 1, wherein:
   determining the first global motion estimate comprises determining the first global motion estimate based on a motion analysis of content of the first picture and content of at least one previous picture.

6. In a video coding system, a method comprising:
responsive to determining global motion associated with a first set of pictures does not exceed a specified threshold, intra-refresh encoding each picture of the first set such that a position of a refresh region for the picture is spatially shifted relative to the position of a refresh region for a previous picture of the first set; and
responsive to determining global motion associated with a second set of pictures exceeds the specified threshold, intra-refresh encoding each picture of the second set such that a position of a refresh region for each picture of the second set is fixed to be immediately adjacent to a picture edge that is in a direction of the global motion associated with the second set of pictures.

7. The method of claim 6, wherein:
the refresh regions for the first set of pictures have the same width;
the global motion associated with the second set of pictures includes a plurality of global motion estimates, each global motion estimate associated with a corresponding picture of the second set; and
the refresh region for a picture of the second set is based on the global motion estimate associated with that picture.

8. The method of claim 6, further comprising:
transmitting an encoded bit stream to a head mounted display (HMD) device, the encoded bit stream including intra-refresh encoded representations of the pictures of the first and second sets.

9. The method of claim 8, further comprising:
decoding, at the HMD device, the encoded bit stream to generate a set of rendered pictures; and
displaying, at a display panel of the HMD device, the set of rendered pictures.

10. The method of claim 9, further comprising:
determining the global motion associated with the first set of pictures based on motion of the HMD device at a first time; and
determining the global motion associated with the second set of pictures based on motion of the HMD device at a second time.

11. The method of claim 6, further comprising:
determining the global motion associated with the first set based on a motion analysis of content of the pictures of the first set; and
determining the global motion associated with the second set based on a motion analysis of content of the pictures of the second set.

12. A system comprising:
an encoder to encode pictures of a stream of pictures to generate an encoded bit stream; and
at least one processor to determine a first global motion estimate associated with a first picture of the stream, to identify an edge of the first picture as the edge of the first picture that is in a direction of the first global motion estimate and to configure the encoder to intra-refresh encode the first picture so that a region of the first picture immediately adjacent to the identified edge is encoded as an intra-coded refresh region of the first picture, and to configure a width of the refresh region based on a magnitude of the first global motion estimate.

13. The system of claim 12, wherein the direction of the first global motion estimate is a direction of a primary directional component of the first global motion estimate.

14. The system of claim 12, wherein:
the at least one processor is to identify the edge of the first picture and configure the encoder to intra-refresh encode the first picture in response to the first global motion estimate exceeding a specified threshold.

15. The system of claim 14, wherein:
the at least one processor further is to determine a second global motion estimate for a second picture of the stream; and
in response to the second global motion estimate not exceeding the specified threshold, the at least one processor further is to configure the encoder to intra-refresh encode the second picture by encoding a region of the second picture that is selected based on a refresh region pattern in which an intra-coded region shifts position between successive pictures of a set of pictures.

16. The system of claim 12, further comprising:
a head mounted display (HMD) device to receive the encoded bit stream, decode the encoded bit stream to generate a decoded stream of pictures, and display the decoded stream of pictures to a user.

17. The system of claim 16, wherein:
the at least one processor is to determine the first global motion estimate based on a motion of the HMD device.

18. The system of claim 12, wherein:
the at least one processor is to determine the first global motion estimate based on a motion analysis of content of the first picture and content of at least one previous picture.

19. The method of claim 2, further comprising:
transmitting an encoded bit stream to a head mounted display (HMD) device, the encoded bit stream including the encoded first picture; and
wherein determining the first global motion estimate comprises determining the first global motion estimate based on a motion of the HMD device.

20. A system comprising:
at least one processor to determine a first global motion estimate for a first picture to be rendered, to compare the first global motion estimate to a threshold, and to identify an edge of the first picture as the edge of the first picture that is in a direction of the first global motion estimate; and
an encoder to, in response the first global motion estimate exceeding the threshold and in response to identifying the edge of the first picture, intra-refresh encode the first picture by encoding a region of the first picture immediately adjacent to the identified edge as an intra-coded refresh region of the first picture.

21. The system of claim 20, wherein:
the at least one processor further is to determine a second global motion estimate for a second picture to be rendered and to compare the second global motion estimate to the threshold; and
the encoder further is to, responsive to the second global motion estimate not exceeding the threshold, intra-refresh encode the second picture at the encoder by encoding a region of the second picture that is selected based on a refresh region pattern in which a position of an intra-coded refresh region shifts between successive pictures of a set of pictures.

* * * * *